United States Patent
Ghamsari et al.

(10) Patent No.: US 11,182,847 B2
(45) Date of Patent: *Nov. 23, 2021

(54) TECHNIQUES TO FACILITATE ONLINE COMMERCE BY LEVERAGING USER ACTIVITY

(71) Applicant: Capital One Services, LLC, McLean, VA (US)

(72) Inventors: Avid Ghamsari, Frisco, TX (US); Micah Price, Plano, TX (US); Geoffrey Dagley, McKinney, TX (US); Qiaochu Tang, The Colony, TX (US); Jason Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/732,658

(22) Filed: Jan. 2, 2020

(65) Prior Publication Data

US 2020/0349634 A1    Nov. 5, 2020

Related U.S. Application Data

(63) Continuation of application No. 16/401,461, filed on May 2, 2019, now Pat. No. 10,565,639.

(51) Int. Cl.
*G06Q 30/06* (2012.01)
*G06F 16/9032* (2019.01)
(Continued)

(52) U.S. Cl.
CPC .... *G06Q 30/0643* (2013.01); *G06F 16/90332* (2019.01); *G06F 16/9538* (2019.01); *G06N 20/00* (2019.01); *G06Q 30/0625* (2013.01)

(58) Field of Classification Search
CPC ............ G06Q 30/0643; G06Q 30/0625; G06F 16/9538; G06F 16/90332; G06N 20/00
(Continued)

(56) References Cited

U.S. PATENT DOCUMENTS 6,981,040 B1    12/2005  Konig et al.
8,280,888 B1    10/2012  Bierner et al.
(Continued)

OTHER PUBLICATIONS

Kalaivani, P., et al., "Sentiment Classification of Movie Reviews by Supervised Machine Learning Approaches", Indian Journal of Computer Science and Engineering 4(4): 285-292, Year 2013.
(Continued)

*Primary Examiner* — Yogesh C Garg
(74) *Attorney, Agent, or Firm* — Kacvinsky Daisak Bluni PLLC

(57) ABSTRACT

The present disclosure is directed to techniques to facilitate online commerce by leveraging user activity, specifically search activity for goods/services on an online platform. As described herein, the online platform refers to a turnkey e-commerce solution that enterprises use to manage electronic transactions involving their goods/services. Some techniques are directed to an improved online platform operative to predict a user's intention behind a search query and after a consider number of search queries, to have that search query as a dynamic search filter for the online platform. Other embodiments are described and claimed.

20 Claims, 9 Drawing Sheets

(51) Int. Cl.
  *G06N 20/00* (2019.01)
  *G06F 16/9538* (2019.01)
(58) Field of Classification Search
  USPC .......................................................... 705/27.1
  See application file for complete search history.

(56) References Cited

U.S. PATENT DOCUMENTS

| | | | |
|---|---|---|---|
| 8,412,698 B1* | 4/2013 | Sarukkai | G06F 16/332 |
| | | | 707/713 |
| 8,447,758 B1 | 5/2013 | Adler et al. | |
| 8,515,893 B2 | 8/2013 | Wilson et al. | |
| 8,589,399 B1 | 11/2013 | Lee et al. | |
| 8,706,557 B1 | 4/2014 | Tavares | |
| 8,805,774 B2 | 8/2014 | Boyer et al. | |
| 8,909,626 B2 | 12/2014 | Park et al. | |
| 9,852,228 B2* | 12/2017 | Martin | G06F 16/248 |
| 10,515,147 B2* | 12/2019 | Moore | G06F 16/24575 |
| 2005/0065774 A1 | 3/2005 | Doganata et al. | |
| 2005/0240580 A1 | 10/2005 | Zamir et al. | |
| 2008/0082479 A1 | 4/2008 | Chang et al. | |
| 2008/0282198 A1 | 11/2008 | Brooks et al. | |
| 2009/0006118 A1 | 1/2009 | Pollak | |
| 2009/0094231 A1 | 4/2009 | Marvit et al. | |
| 2009/0204609 A1 | 8/2009 | Labrou et al. | |
| 2009/0327279 A1 | 12/2009 | Adachi et al. | |
| 2010/0145954 A1* | 6/2010 | Barlin | G06F 16/9537 |
| | | | 707/754 |
| 2010/0274821 A1 | 10/2010 | Bernstein et al. | |
| 2011/0029636 A1 | 2/2011 | Smyth et al. | |
| 2012/0143924 A1 | 6/2012 | Sethi et al. | |
| 2013/0031083 A1 | 1/2013 | Madhavan et al. | |
| 2014/0067846 A1 | 3/2014 | Edwards et al. | |
| 2014/0279263 A1 | 9/2014 | Liu et al. | |
| 2014/0280145 A1 | 9/2014 | Heit et al. | |
| 2015/0169710 A1 | 6/2015 | Xu et al. | |
| 2016/0012507 A1 | 1/2016 | Narin | |
| 2016/0125459 A1 | 5/2016 | Tognetti | |
| 2016/0179967 A1 | 6/2016 | Sa et al. | |
| 2016/0292759 A1 | 10/2016 | Gonzalez Miranda et al. | |
| 2016/0299977 A1 | 10/2016 | Hreha | |
| 2016/0364783 A1 | 12/2016 | Ramanuja et al. | |
| 2017/0097823 A1 | 4/2017 | Chee et al. | |
| 2017/0169030 A1 | 6/2017 | Ben-Tzur | |
| 2017/0235464 A1 | 8/2017 | Ben-Tzur | |
| 2018/0025044 A1 | 1/2018 | Hostetter et al. | |
| 2018/0032882 A1 | 2/2018 | Joshi et al. | |
| 2018/0232441 A1* | 8/2018 | Lin | G06F 16/9535 |
| 2018/0247319 A1 | 8/2018 | Yoder et al. | |
| 2018/0336580 A1 | 11/2018 | Kato | |
| 2019/0080225 A1 | 3/2019 | Agarwal et al. | |
| 2019/0087882 A1 | 3/2019 | Wollmer et al. | |
| 2019/0164211 A1 | 5/2019 | Andrew et al. | |
| 2019/0205962 A1 | 7/2019 | Piramuthu et al. | |
| 2019/0213663 A1 | 7/2019 | Chowdhury | |
| 2019/0266158 A1 | 8/2019 | Bolla et al. | |
| 2019/0354802 A1 | 11/2019 | Lin et al. | |
| 2020/0152073 A1 | 5/2020 | Kim et al. | |
| 2020/0226418 A1* | 7/2020 | Dorai-Raj | G06F 11/3447 |

OTHER PUBLICATIONS

Stanley et al., "Comparing Vector-Based and ACT-R Memory Models Using Large-Scale Datasets: User Customized Hashtag and Tag Prediction on Twitter and StackOverflow", 2014; Published at Rice University; ProQuest Dissertations Publishing, extracted from Dialog Solutions on May 25, 2020, 17 pages.

* cited by examiner

Search Mechanism 300

CHATBOT 302

Chatbot: How can I help?

Customer: I would like to purchase a car. One that is Rough and Tough.

Chatbot: Please select from this sorted list.

Chatbot: Thank you. Would you like me to narrow these choices?

Customer: From my selections, show me "eco-friendly."

700

RUN AN ONLINE PLATFORM AND GENERATE A SEARCH MECHANISM
702

UPDATE A MACHINE LEARNING MODEL IN RESPONSE TO RECENT CHATBOT SEARCHES
704

UPDATE A SEARCH PORTAL OF AN ONLINE PLATFORM BY REMOVING/REPLACING/ADDING A SEARCH FILTER
706

*FIG. 7*

TECHNIQUES TO FACILITATE ONLINE COMMERCE BY LEVERAGING USER ACTIVITY

RELATED APPLICATION

This application is a continuation of U.S. patent application Ser. No. 16/401,461, titled "TECHNIQUES TO FACILITATE ONLINE COMMERCE BY LEVERAGING USER ACTIVITY" filed on May 2, 2019. The contents of the aforementioned application are incorporated herein by reference.

BACKGROUND

Consumerism, although constantly evolving, has been (throughout history) behind many of the important transformations in everyday life. Fewer people frequent brick-and-mortar establishments than in previous years and, at present time, many consumers look to technology to satisfy their needs and wants. A growing number of people engage in commerce over the Internet and/or via mobile applications, ultimately transitioning shopping from a physical experience to a digital one. Companies who wish to survive given this transition must invest in technology capable of providing an online/digital shopping experience or, otherwise, must contend with a shrinking market share. One aspect of such technology is a graphical user interface (GUI) that presents content describing and/or depicting goods/services for sale. Another aspect of such technology is a component that predicts which goods/services match a consumer's interests.

It is with respect to these and other considerations that the present improvements have been desired.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to facilitate online commerce for goods/services by leveraging user activity, specifically, user search activity with respect to an online platform. Some embodiments are particularly directed to facilitate online commerce by developing an improved understanding of a customer's intent behind their natural language searches. This improvement supports various aspects of an online shopping experience.

In one embodiment, for example, an apparatus may include a processing circuit and logic stored in computer memory and executed on the processing circuit. The logic may be operative to cause the processing circuit to process mapping information comprising datasets of which each dataset comprising a set of words, a set of items, and at least one relevance score. The logic may be further operative to cause the processing circuit to generate a machine learning model from the mapping information and platform search data corresponding to search queries submitted to the online platform. The platform search data storing selections of items and associated search terms. The logic may be further operative to cause the processing circuit to identify, from the machine learning model, a word or word combination to have as a search filter in the online platform and update the online platform to include the search filter and deploy the updated online platform. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced, and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an embodiment of a second logic flow for the system of FIG. 1.

DETAILED DESCRIPTION

Figure 1:
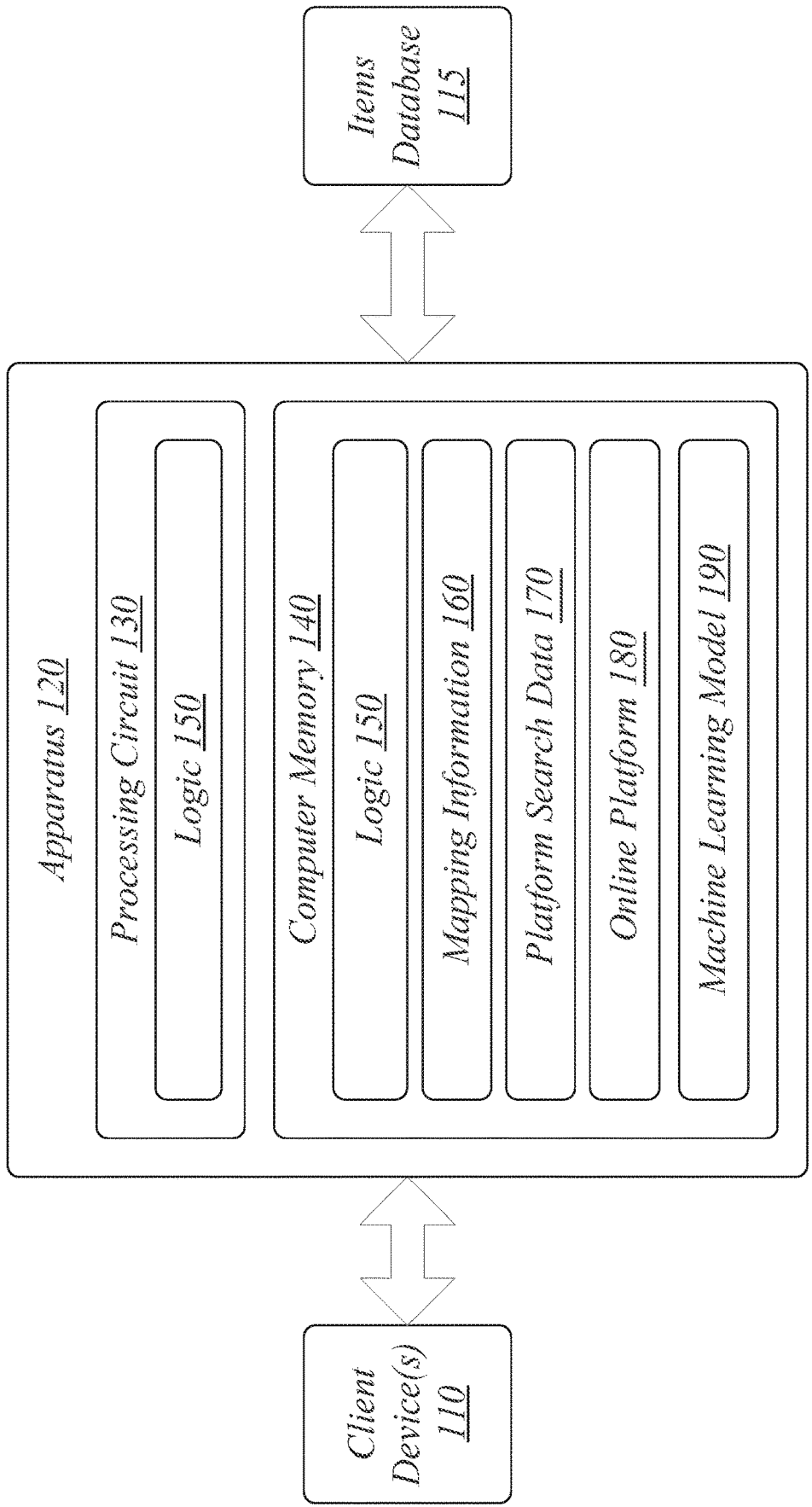
FIG. 1 illustrates an embodiment of a system to facilitate online commerce by leveraging user activity.

Various embodiments are directed to an apparatus, a computer-implemented method, and a computer-readable storage medium directed to facilitate online commerce by leveraging user activity. At least one embodiment includes an apparatus having a processing circuit and logic stored in computer memory and executed on the processing circuit. The logic may be operative to cause the processing circuit to process mapping information comprising datasets of which each dataset comprising a set of words, a set of items, and at least one relevance score. The logic may be further operative to cause the processing circuit to generate a machine learning model from the mapping information and platform search data corresponding to search queries submitted to the online platform. The platform search data storing selections of items and associated search terms. The logic may be further operative to cause the processing circuit to identify, from the machine learning model, a word or word combination to have as a search filter in the online platform and update the online platform to include the search filter and deploy the updated online platform. In general, the logic enables an online commerce (i.e., e-commerce) solution with a dynamic search filter for the online platform; whereas, conventional online commerce solutions employ static search filters.

More importantly, these conventional static search filters are not based upon natural language search queries and do not reflect what user's actually desire. Not only are these search filters configured offline, these search filters often are based on expert knowledge (e.g., an automobile technical specification) and/or configured to narrow down choices by some standardized feature (e.g., an automobile feature such as a number of doors, engine size, transmission type, and/or the like).

In additional, a typical consumer does not know exactly which item (e.g., automobile) to acquire but does have a general description of what they desire in that item. Sometimes, the general description refers to a feature of item instead of the item itself. The typical consumer may enter into a public search engine or a propriety search engine that general description as a search query. There is a need for an improvement in existing search technology, particularly in conventional static search filters, to find relevant search results for that general description. As a result, the embodiments can improve e-commerce in general with better search capabilities for an operator, device or network.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The processes presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having an apparatus 120 communicably coupled to client device(s) 110 and an items database 115.

The apparatus 120 may be generally arranged to process input of which some input may be provided directly via an input device, and other input may be provided via a network. For example, a user may enter data via a keyboard device attached to the apparatus 120 while the client device(s) 110 may transmit data across the network and into a network interface within the apparatus 120. The apparatus 120 may be generally arranged to generate output of which some output may be configured for display on a display device and other output may be communicated across the network to other devices. As an example, the apparatus 120 may publish information by storing the information in a network accessible location and configuring that information into a structure that can be processed/rendered into content for a Graphical User Interface (GUI). The client device(s) 110 may access the content for consumption (e.g., via a browser operating system component or a mobile application) while the public search engine(s) may access the content during a routine Internet crawl.

The apparatus 120 may include a processing circuit 130 and computer memory 140 on which logic 150 is stored and executed, respectively. The logic 150 is operative to cause the processing circuit 130 to process mapping information 160 storing datasets of which each dataset includes a set of words, a set of items, and a relevance score. It should be noted that the relevance score in a particular dataset may refer to any value denoting a relationship between the set of words and the set of items of that particular dataset. Those skilled in the art would understand how to qualify that relationship in some respect; for example, the relevance score may represent a frequency or frequency range of finding the set of words in a textual description of the set of items. As another example, the relevance score may result from a heuristic function that is adapted to quantify relevance between the set of words and the set of items.

In some embodiments, the mapping information 160 is generated (at least initially) by examining a corpus of materials describing the items being commercialized on the online platform 180. At least some of these descriptive materials are stored in the items database 115. In at least one embodiment, an example relevance value between a set of words and a particular item or set of items may be a frequency or a probability of being found in a portion of the corpus of materials describing the particular item or set of items. The example relevance value may be modified in view of searches performed on an online platform 180.

As described herein, the online platform 180 may refer to a turnkey e-commerce solution being deployed over networked devices, such as the apparatus 120, to manage the sale and/or distribution of goods (which is herein referred to as items). The online platform 180 may manifest in the form of an Internet website or a mobile application—where a Graphical User Interface (GUI) frontend presents items for sale and an administrative backend controls the GUI and handles electronic transactions. People using the online platform 180 benefit from the dynamic and targeted search filters that provide accurate results in terms of relevance. In general, the online platform 180 refers to executable software code that, when executed, generates a Graphical User Interface (GUI) presenting the set of items.

As people, via some search mechanism, peruse the online platform 180 and navigate through a collection of items in search of one or more items to acquire, platform search data 170 records search-related information. The logic 150 is further operative to cause the processing circuit 130 to generate a machine learning model 190 using the mapping information 160 and the platform search data 170 indicating selections of items and associated search terms that were used while searching the online platform 180. As described herein, the online platform 180 may include, as one example search mechanism, a chatbot through which one or more search queries are submitted. In some embodiments, the platform search data 170 stores each search query's search terms and associated search results in addition to which search result(s) were selected and, perhaps, ultimately purchased.

Machine learning models predicting the user's intent behind a search term characterizing their desired automobile(s) would enhance traditional approaches to selling automobiles through the Internet. Machine learning models based upon on automobile reviews (both by experts and non-experts), specifications, and other descriptive materials have been disclosed in a co-pending U.S. patent application Ser. No. 16/254,504, filed Jan. 22, 2019, by Capital One Services, LLC entitled "OFFERING AUTOMOBILE RECOMMENDATIONS FROM GENERIC FEATURES LEARNED FROM NATURAL LANGUAGE INPUTS" and subject to assignment to a same assignee as the present disclosure. The disclosure of the above-mentioned co-pending US application is hereby incorporated by reference.

It is appreciated that the machine learning models described in the above-mentioned co-pending US application can be built and trained using a same set of materials as the machine learning model 190 described herein. It is further appreciated that the machine learning model 190 may be initially configured in accordance with the machine learning models described in the above-mentioned co-pending US application. In other embodiments, the logic 150 operates on the machine learning model 190 that is initially configured to some default state and to be an improvement upon the machine learning models described in the above-mentioned co-pending US application.

The logic 150 is further operative to cause the processing circuit 130 to identify, from the machine learning model 190, a search term comprising a word or combination of words to have as a search filter in the online platform 180. The logic 150 is further operative to cause the processing circuit 130 to update the online platform 180 to include the search filter and then, deploy the updated online platform 180. In some embodiments, the identified search term corresponds to a highest relevance score in the datasets of the updated mapping information 160 and, in at least one embodiment, the relevance score may represent a probability or likelihood that the user selects one or more items given that the search query includes the identified search term. When, in a considerable number of search queries, different users enter a particular word or word phrase and ultimately select a specific item from a set of search results, the logic 150 may leverage that relationship to improve the online platform 180 in a number of ways. One example improvement is to use the identified search term as a new search filter for the online platform 180. Although the present disclosure is dedicated to describing specific improvements, it is appreciated that there may be a number of other improvements attributable to the embodiments described herein.

It is appreciated that the logic 150 may rely upon the mapping information 160, the platform search data 170, or both the mapping information 160 and the platform search data 170 to identify a search term comprising a word or combination of words to have as a search filter in the online platform 180. In some embodiments, the online platform 180 may present an initial set of search filters that are determined by evaluating the mapping information 160 generated from expert/consumer reviews and identifying relevant search term clusters. The mapping information 160 includes mappings between words or word combinations and items, which can be clustered by item or by word or word combination. An example relevant cluster may encompass word-frequency pairs whose frequency values (e.g., a relevance score in a form of a ratio or probability) exceed a threshold value. The example relevant cluster may also satisfy threshold requirements with respect to sample size and/or a minimum number of words/items.

For example, when the online platform 180 includes automobiles for purchase, the initial search filters may be determined from car reviews based on a threshold number of items in a search term cluster. It is appreciated that there may be other considerations besides the threshold number of items for determining whether a particular set of words could be used in a search filter. One example consideration may measure the particular an overall relevancy between a set of words and an item or a group of items, perhaps based on a correlation between the search term and a generic automobile category. If there is a ninety (90) percent probability between "rough and tough" and pickup trucks, a search filter for the online platform 180 is created. If there is a six (6) percent probability between "kid-friendly" and pickup trucks, a search filter chance is not created. These probabilities (or another relevance score) may be refined/updated with the platform search data 170 and/or other data.

In some embodiments, the logic 150 provides the mapping information 160 and the platform search data 170 to the machine learning model 190 that is configured to predict which items are relevant to the user's (potential) natural language search queries. The machine learning model 190 may include features related to user preferences when determining which item(s) are relevant. The apparatus 120 processes input data when the user enters a natural language search query into a search portal of the online platform 180 (e.g., via a keyboard device) and the logic 150 parses the input data into tokens and identifies, from those tokens, one or more search terms for searching the collection of items provided by the online platform 180. By analyzing the one or more identified search terms and features related to the natural language search, the logic 150 uses the machine learning model 190 to determine which item(s) to select as being relevant to the user's natural language search query.

Another example feature may relate in some manner to location data corresponding to either the user's location or another location. In some embodiments, the logic 150 configures the machine learning model 190 to identify search term clusters and one or more sub-clusters within a particular cluster, providing primary and secondary associations between the search terms and the items (e.g., the automobiles). The machine learning model 190 may partition a probability distribution of a search term by location such that each data point corresponding to a specific location (e.g., a ZIP code) and may include a relevance score between the search term and a particular automobile in that specific location. To illustrate by way of example, a person from the State of Texas when searching for "rough and tough" vehicles in may refer to a different group of automobiles than a person in the State of Massachusetts who also is searching for "rough and tough" vehicles.

If a search term in the user's query corresponds to (e.g., matches at least part of) a set of words in the mapping information 160, the logic 150 uses the machine learning model 190 to determine which item(s) to select as relevant to the user's natural language search query according to some embodiments. The machine learning model 190 may rely upon features related to the natural language search query in addition to the search terms to determine which item(s) are sufficiently relevant. To maintain accuracy in the machine learning model 190, the logic 150 trains the machine learning model 190 with recent mapping information 160 and recent platform search data 170. In some embodiments, the logic 150 trains the machine learning model 190 with a feature set including, but not limited to, the word-frequency pairs stored in the mapping information 160 and the user selections made during previous search sessions.

As described herein, the platform search data 170 (in part) records user selections submitted to the search mechanism provided by the online platform 180 (e.g., a search window or a chatbot). In each search session, the user enters a search query into the search mechanism, and the online platform 180 provides, in response, selectable item choices for the user to peruse and ultimately to choose. The user's selection of an item choice strongly indicates that the item choice is relevant to the user's search query. In some embodiments, the user selections may be directed towards generic item choices—instead of actual item choices—through a series of search sessions. By presenting the generic item choices on a graphical user interface and recording which of the generic item choices are ultimately selected, the logic 150 may identify which generic item choices are relevant to the user's natural language search query. The use of generic item choices allows for the logic 150 to eliminate or minimize other factors (e.g., brand names) when training the machine learning model 190; even though it is possible some of these factors might play a role in the user's item selection, the logic 150 may nullify that the role by using generic item choices. As an alternative, the machine learning model 190 assumes these factors by assigning weight variables of value zero (0).

One example implementation of the machine learning model 190 includes a statistical model that when given a set of words as input x, provides a probability $p(y|x)$ of an item or a set of items being relevant to the given set of words. The item or the set of items may be returned as a search result if the set of words were used to execute a search query. In the context of online automobile searching/shopping, the machine learning model 190 may indicate a generic automobile that correlates to the set of words and if that correlation is significant (e.g., exceeds a pre-defined threshold probability), the set of words may be included in a search filter of a search mechanism provided by the online platform 180.

In one or more embodiments, the machine learning model 190 is trained to associate generic language with language related to specific automobile features (a specific language related to the specific automobile features), specific automobile types, and/or specific automobile makes and models. In one or more embodiments, the machine learning model 190 and associated components can output a probability distribution that a particular word or word combination is associated with a particular automobile feature, automobile type, and/or automobile make and model, e.g., the likelihood that the automobile feature, automobile type, and/or automobile make and model is a preferred automobile feature, automobile type, and/or automobile make and model of the user making the generic request.

The logic 150 may improve the online platform 180 by adding search filters to the search mechanism provided by the updated online platform 180. This may involve creating a GUI element with textual data including (in part) the identified search term and configuring that GUI element with functionality to present one or more items associated with the identified search term. The logic 150 may insert, into the updated online platform 180, executable instructions (e.g., software code) that are invoked when a user activates the GUI element via some control directive. It is appreciated that those of ordinary skill would define control directive to include a tactile or touch commands as well as Natural User Interface commands (e.g., a gesture command, a voice command, and/or the like). In some embodiments, the logic 150 may insert software code configured to execute a search query for the identified search term against the items database 115. This may be used when recent/up-to-the-minute search results are desired while, in other embodiments, the software code may be configured to access a corresponding dataset in the mapping information and retrieve one or more items based upon relevance score.

By way of example, consider the online platform 180 to be an online shopping platform configured for selling automobiles where the client device(s) 110 submit natural language search queries when searching through a collection of automobiles. The platform search data 170 stores information corresponding to these natural language searches. In this example, the items database 115 stores a corpus of descriptive materials about automobiles, such as consumer/expert reviews and manufacturer specifications, from which the mapping information 160 is built. Using this mapping information 160 (with or without the platform search data 170), the logic 150 generates the machine learning model 190 to predict which automobiles are relevant to any given natural language search query. As described herein, the logic 150 continues training of the machine learning model 190 with the platform search data 170. If the logic 150 identifies an automobile or more than one automobile (i.e., a set of automobiles) whose relevance to a particular search term exceeds some threshold, the logic 150 may use the particular search term as a new search filter to add to the online platform 180.

In some embodiments, the platform search data 170 may record user selections of actual item choices in addition to or as an alternative to the above-mentioned generic item choices. The recorded user selections operate as feedback improving the machine learning model 190. The logic 150 in accordance with such embodiments operates in a same or similar manner as embodiments where only generic item choices are recorded. With respect to the automobile shopping platform, the logic 150 continues to train the machine learning model 190 with mappings between search queries and selections of actual automobile choices and/or generic automobile choices. According to at least one embodiment, the generic automobile choice may represent a class or type of automobile (e.g., a pickup truck, a hybrid, and/or the like) and when the user selects a certain generic automobile choice after submitting a search query, the logic 150 translates that selection into a mapping between the search query and a set of automobiles corresponding to the certain generic automobile choice.

By way of an example, consider a requesting client device 110 submitting a natural language search query that is directed to a set of words comprising "rough and tough" and entered into a chatbot (i.e., a type of search mechanism for the online platform 180). It is appreciated that the search term "rough and tough" may have been presented as a suggested search query to the user of the requesting client device 110. In an alternative example, the chatbot may present the search term "rough and tough" in a search filter. The chatbot, as instructed by the logic 150, returns a set of generic automobile choices of which each generic automobile choice refers to a class or type of automobile (e.g., a generic jeep-like vehicle, a pickup truck, a sedan, a sportscar, a hybrid, an electric car, and/or the like). The machine learning model 190 may identify each of these generic automobile choices for having a relevance score (e.g., a word-frequency pair feature) that exceeds a threshold value. The machine learning model 190 may also identify one or more search terms to suggest to the user as dynamic natural language search queries/search filters.

When the user makes a selection (indicating at least some relevance between "rough and tough" and the selected generic automobile choice), the platform search data 170 records the user selection and the logic 150 updates the machine learning model 190. In one embodiment, the logic 150 creates/updates a corresponding dataset for the set of words comprising "rough and tough" such as by increasing a corresponding relevance score to reflect the user selection. This may be accomplished by adding/updating a feature corresponding to searches and combining this feature to other feature values (e.g., a word-frequency pair) to recompute the relevance score between "rough and tough" and the selected generic automobile choice. For example, if the user selects a generic pickup truck, the logic 150 increases a relevance score between "rough and tough" and the generic pickup truck. As an alternative, the logic 150 may increase a relevance score between "rough and tough" and a set of specific pickup trucks. It is appreciated that the system 100 may implement the machine learning model 190 for any dataset in the mapping information 160, refining one or more mappings in a dataset including a set of words and a generic automobile choice.

The machine learning model 190 may further identify specific automobile choices for the set of words comprising "rough and tough" and the logic 150 produces output to present, on the requesting client device 110, a set of specific automobile choices (e.g., specific automobile makes and models, such as a 2019 FORD® F-150®). According to one embodiment, given a set of features including a specific automobile's word-frequency pair value with "rough and tough" and the user selection of the generic pickup truck, the logic 150 uses the machine learning model 190 to determine a relevance score (e.g., a probability) between "rough and tough" and the specific automobile (e.g., a 2019 FORD® F-150®). The logic 150 examines the machine learning model 190 for other specific automobile choices, selecting any automobile (e.g., any pickup truck make/model) having a sufficient relevance score to present to the user via the online platform 180. The logic 150, in turn, instructs the online platform 180 to produce content presenting a set of relevant pickup trucks as specific automobile choices.

In some embodiments, the logic 150 uses the machine learning model 190 to improve the functionality of the online platform 180. In at least one embodiment, the logic 150 may determine whether one or more words from previous natural language search queries can be used to improve the online platform 180 with respect to automobile shopping. It is appreciated that in these and for other embodiments, the logic 150 is not limited to previous natural language search queries when determining whether one or more words can be used to improve the online platform 180; the logic 150 may select one or more words from descriptive automobile-related materials in the item database 115.

As the user engages the search mechanism to navigate through the item database 115, the machine learning model 190 may correlate sets of words to sets of automobiles of which each automobile has a probability or likelihood of being relevant to a particular set of words. For a certain set of words, the machine learning model 190 may identify a set of automobiles for which there is a suitable likelihood or probability of being relevant choices if the certain set of words were submitted as a search query. The certain set of words may belong to a most prevalent natural language search query amongst recent or historical search queries. Once identified, the logic 150 may use the certain set of words to generate a search filter, providing an improved search mechanism for the online platform. As one example, if the logic 150 identifies, for the certain set of words, a set of automobiles of which each automobile's probability or likelihood of being relevant exceeds a threshold, the logic 150 uses the certain set of words to generate a new search filter for inclusion into the online platform 180 or, as an alternative, to update a (dynamic) search filter by replacing a corresponding search query with the certain set of words.

Figure 2:
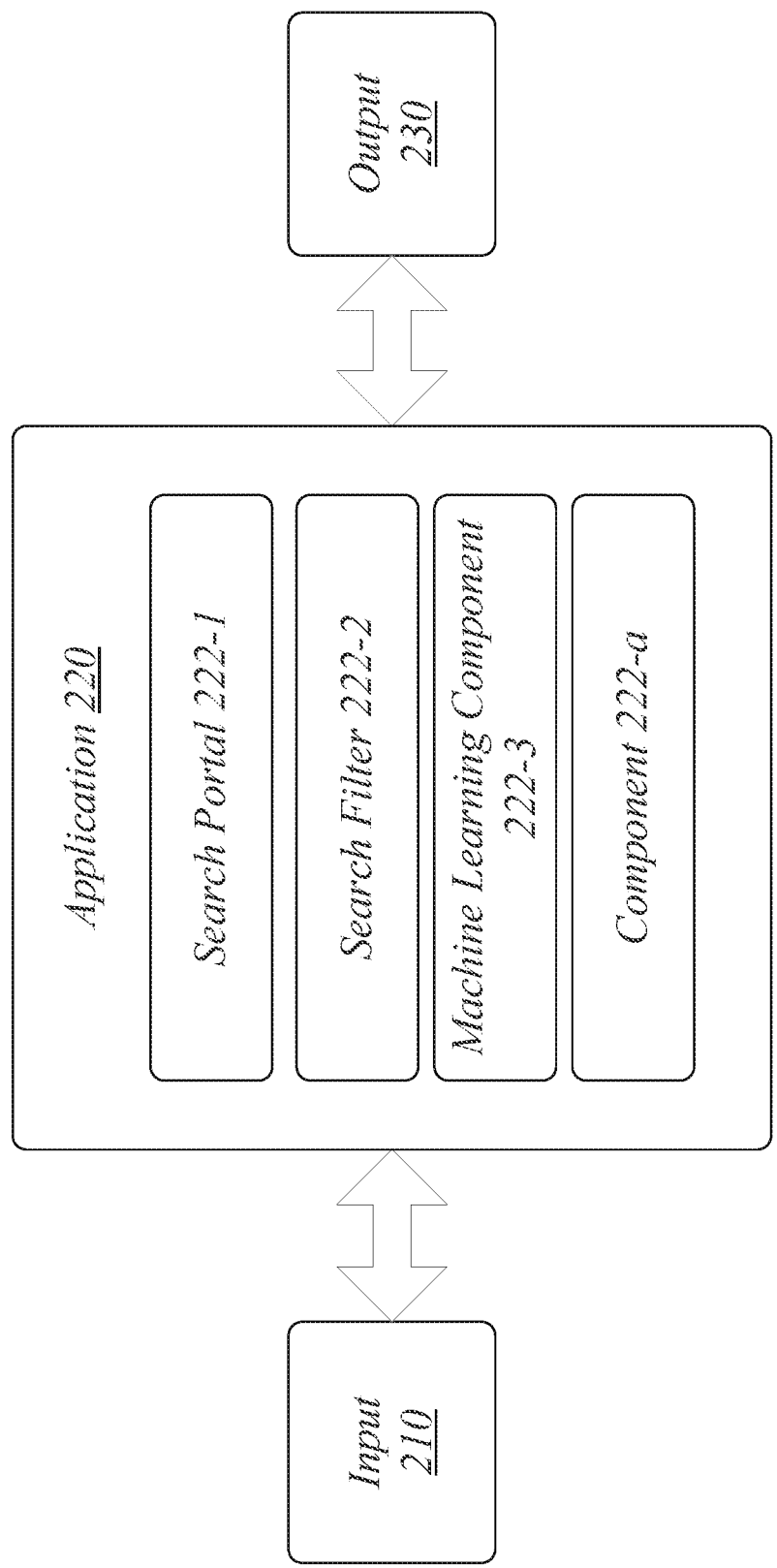
FIG. 2 illustrates an embodiment of an online platform for the system of FIG. 1.

FIG. 2 illustrates a block diagram for an online platform 200 for the system 100. In one embodiment, the system 100 may comprise a computer-implemented system 100 of which the online platform 200 is a turnkey e-commerce solution having a software application 220 comprising one or more components 222-a. Although the system 100 shown in FIG. 1 and FIG. 2 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 222-a may include components 222-1, 222-2, 222-3, 222-4 and 222-5. The embodiments are not limited in this context.

The online platform 200 may be part of an e-commerce solution for any enterprise selling a product or product group. The online platform 200 may comprise the application 220. The application 220 may be generally arranged to process input 210 and generate output 230 while operating as the e-commerce solution's frontend interface. In general, the application 220 implements functionality that includes displaying a Graphical User Interface (GUI) and coordinating with a backend administration.

Figure 4:
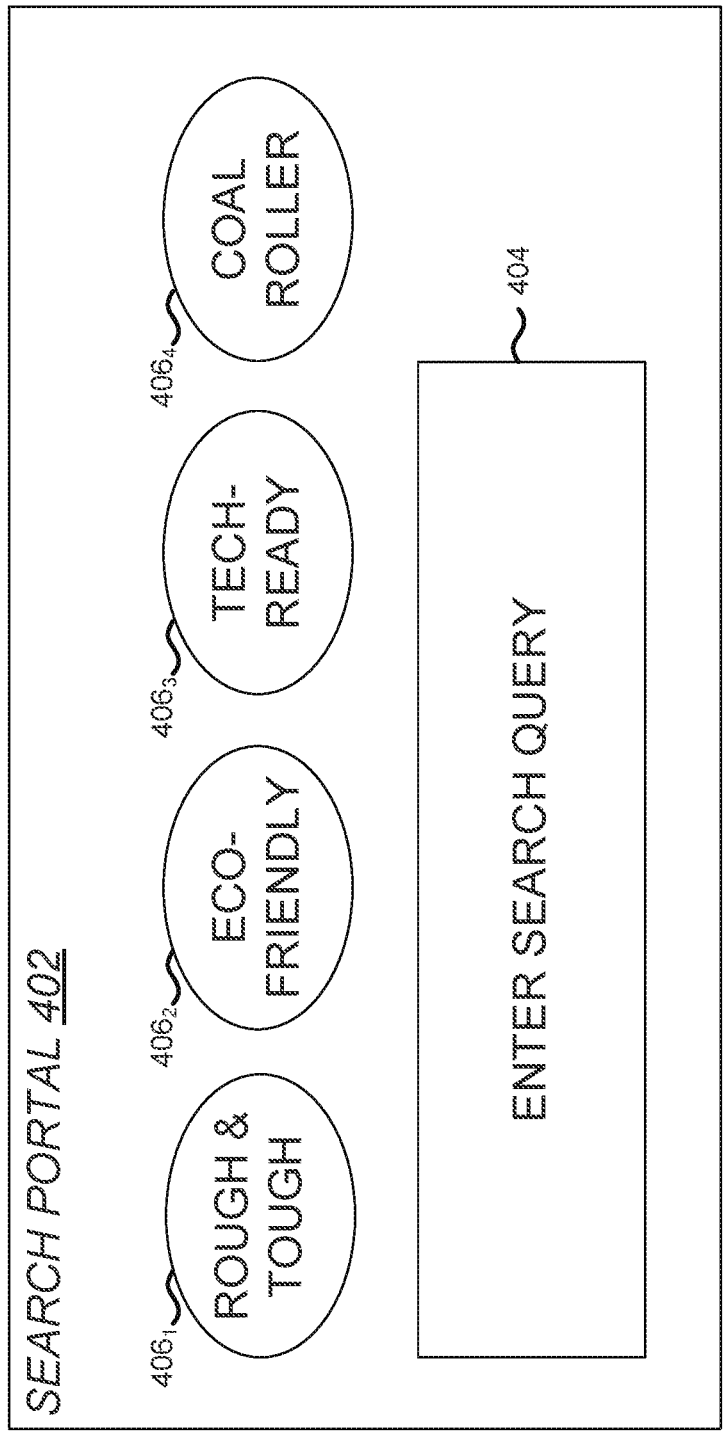
FIG. 4 illustrates an embodiment of a user interface for the online platform in the system of FIG. 1.

The application 220 may provide various components for operating the GUI, including a search portal 222-1 generally arranged to operate at least one search mechanism for the online platform 200. The search portal 222-1 may be generally arranged to process search queries as input and respond with search results as output comprising a set of relevant items. To assist the user, the search portal 222-1 may include search filters of which at least one search filter 222-2 (visually) takes the form of a GUI element with embedded text at least suggesting a search query. As illustrated in FIG. 4, the search filter 222-2 may be represented as a GUI button element with embedded text stating a corresponding search query.

Activation of the search filter 222-2's GUI element (via a touch or gesture command) executes software code in the application 220 dedicated towards executing the corresponding search query and returning a set of search results. The application 220, as an alternative, may return a set of pre-determined search results to the corresponding search query of the search filter 222-2.

As described herein, the search filter 222-2 may be a dynamic search filter whose corresponding search query may be modified over time (e.g., based on popularity or other factors). In some embodiments, the system 100 (e.g., via the logic 150 of FIG. 1) configures the search filter 222-2 to execute a search query with a particular word or word combination. To explain by way of example, if the particular word or word combination (e.g., a phrase) increases in popularity, that particular word or word combination may improve the search portal 222-1 as a search filter. The system 100 may recognize a sudden increase to a word-frequency pair of the particular word or word combination (e.g., an increase by a specific percentage within a period of time) and in response to such a rise in popularity, modifies the search filter 222-2. As an alternative, the system 100 may access the word-frequency pair at a current moment in time, and if that word-frequency pair exceeds a threshold value (i.e., achieving a level of popularity), the system 100 replaces the corresponding search query of the search filter 222-2 with the particular word or word combination.

The application 220 may further include various components for coordinating with the backend administration of the e-commerce solution, which may be running on an electronic device (e.g., the apparatus 120 of FIG. 1) of the computer-implemented system 100. A machine learning component 222-3, one example component for coordinating with the backend administration, provides access to a machine learning model such as the machine learning model 190 of FIG. 1 as described herein. When the application 220 receives a control directive invoking execution of the above-mentioned search query over a collection of items (e.g., the items database 115 of FIG. 1), the machine learning component 222-3, via the machine learning model, executes the search query. The machine learning component 222-3 may communicate the search query to the above-mentioned electronic device for execution or, as an alternative, run the search query locally. The above-mentioned electronic device may use the machine learning model to predict or identify which items best fit the user's intention behind the search query.

As described herein, the machine learning model may invoke some metric for formally quantifying some condition/quality in various aspects known as features. The present disclosure characterizes this condition/quality as relevance and the above-mentioned metric may define relevance in terms of numeric values (e.g., probabilities). Given a set of features, the machine learning model produces a relevance score between a particular item and the search query. The machine learning model may be a statistical model and the relevance score may be a probability value indicating a likelihood of the particular item being selected by the user given the set of features and a set of words comprising the search query. In another embodiment, the machine learning model is based upon a heuristic function or a set of heuristic functions, and the relevance score may be any real number.

Regardless of the machine learning model's implementation, the machine learning component 222-3 receives, from the backend administration, the information storing a set of relevant items to be displayed on a display device via the output 230. The set of relevant items are in response to the corresponding search query of the search filter 222-2, and each item of the set of relevant items has a relevance score exceeding a threshold. The search portal 222-1 and/or another GUI component of the application 220 may generate content in the form of a document (e.g., an HTML document, such as a web page) displaying the set of relevant items. It is appreciated that the present disclosure does not exclude any particular form of content and a GUI component of the application 220 may generate content in another form. The application 220 may display the set of relevant items in a separate pane of the GUI.

In some embodiments, the corresponding search query for the above-mentioned set of relevant items may have been selected for inclusion as the search filter 222-2 into the online platform 200. The machine learning component 222-3 may have determined that the search query corresponds to search results with relevance scores that exceed a threshold and for at least that reason, found it advantageous and beneficial to use for a dynamic search filter. As an example, if a word-frequency pair associated with one or more search terms of the search query exceeds some pre-defined threshold, the application 220 may insert the search query into software code or instructions for the search filter 222-2.

Figure 3:
FIG. 3 illustrates an embodiment of a search mechanism for the online platform in the system of FIG. 1.
Figure 3:

FIG. 3 illustrates an embodiment of a search mechanism 300 for the system 100. As shown in FIG. 3, the search mechanism 300 may take the form of a chatbot 302 configured to engage in a natural language conversation with a customer.

The chatbot 302 may assist the customer in searching a collection of items for at least one item to purchase. Such searching may form part of a training process for a machine learning model (e.g., the machine learning model 190 of FIG. 1). As described herein, the customer's queries and subsequent selections can be used to identify relevant items for specific queries. Moreover, the customer's selections—which may be referred to herein as user selections—may be used to build the machine learning model into an accurate mechanism for determining whether a specific item is relevant to a given search query's search term(s). In some embodiments, the machine learning model may be a neural network or a statistical model that when given a search query, classifies the collection of items according to relevance. With a set of words comprising the search query as input to the chatbot 302, the machine learning model (e.g., via a heuristic function) may produce, for each item, a relevance value; and if that relevance value exceeds a threshold, the corresponding item is identified as relevant to that customer's search query.

With respect to FIG. 3, the chatbot 302 is assisting the customer to find and (eventually) select an automobile to purchase. In the exchange depicted in FIG. 3, the customer entered a natural language search query comprising search terms in the phrase "rough and tough" to which the chatbot 302 responded with a sorted list of automobile choices. The chatbot 302 creates log data (e.g., in the platform search data 170 of FIG. 1) indicating the natural language search query and the sorted list of automobile choices.

In some embodiments, the search mechanism 300 produces the sorted list of automobiles by a sorting algorithm that adjusts an ordering of automobiles. As an example, the sorting algorithm may order the list of automobiles by a certain attribute, such as price or distance from the customer, or a generic automobile feature. As another example, the sorting algorithm may order the list of automobiles by popularity. Based upon the popularity of a particular automobile, the search mechanism 300 may move that particular automobile to a beginning of the sorted list of automobiles. The chatbot 302 may illustrate a representation of the particular automobile, shown as a rectangular shape at a leftmost position in FIG. 3.

The chatbot 302 of FIG. 3 represents, as a series of rectangular shapes (i.e., boxes), the sorted list of automobile choices, which in some embodiments includes generic automobile choices (e.g., generic makes and/or models). The generic automobile choices, for example, may include a generic sedan, a generic minivan, a generic pickup truck, and/or the like. The customer's choice of generic automobile indicates a relevancy relationship between the customer's query of "rough and tough" and, in some embodiments, a frequency of that user selection (over time) is an example feature indicating relevance. To illustrate by way of example, it may be the case that the customer intends to purchase a powerful automobile when that customer submitted "rough and tough" into the chatbot and (accordingly) there should be more selections of the generic pickup truck than selections of a generic sedan or a generic station wagon. Hence, for the phrase "rough and tough", presenting a list of sedans of various makes and models will result in fewer selections/purchases than a list of pickup trucks.

As described herein, if the frequency or ratio regarding selections of a generic pickup truck exceeds a threshold and/or is statistically significant, the phrase "rough and tough" reliably relates to pickup trucks in general. The search mechanism 300, therefore, may respond with a list of specific pickup truck makes/models, and the customer most likely will find those search results relevant to their search query. FIG. 3 illustrates the list of specific pickup truck makes/models as a series of rectangular shapes (i.e., boxes). In some embodiments, the system 100 refines the machine learning model in response to a user selection of a specific pickup truck from the list of specific pickup trucks, for example, by increasing a relevance score between a set of words comprising "rough and tough" and the specific pickup truck.

In some embodiments, a search filter for "rough and tough" may be added to a search portal, which is another type of search mechanism for an online platform. The system 100 may also update the chatbot 302 to include the search filter for "rough and tough" to facilitate future searches with that term. In at least one embodiment, the system 100 may configure the chatbot 302 to suggest "rough and tough" as a dynamic natural language search query during a search session. If a considerable number of searches are performed on "rough and tough", inserting the search filter improves the online platform at least by facilitating a desirable user experience. The system 100 may examine the machine learning model and identify the list of specific pickup trucks as relevant automobile choices. The system 100 may couple the list of specific pickup trucks to the search filter for "rough and tough" such that activating the search filter results in the presentation of the list of specific pickup trucks. As an alternative, the system 100 may configure the search filter for "rough and tough" to run a search of automobile choices.

According to at least one embodiment, the system 100 examines the updated machine learning model and identifies a mapping between a set of words and one or more automobiles with a highest relevance score. The system 100 may add a new search filter and configure this new search filter with a search query comprising the above-mentioned set of words. In another embodiment, depending upon certain factors, the system 100 may remove the search filter for "rough and tough" and add the new search filter for a search query comprising the above-mentioned set of words. If "rough and tough" corresponds to a higher relevance score than the relevance score for the above-mentioned set of words, the system 100 may retain the search filter for "rough and tough"; otherwise, the system 100 may replace the search filter for "rough and tough."

As an alternative, the system 100 generates a label for any automobile having a sufficient relevance score for the above-mentioned set of words. The label, in general, refers to markup language element (e.g., a HTML <label> element) that is used to associate a text label with another element (e.g., a GUI element, such as a picture). In some embodiments, the label includes textual data comprising the above-mentioned set of words or another set of words. As an example, the system 100 may use "rough and tough" as the label for a relevant automobile such that the chatbot 302 generates a GUI element with "rough and tough" as embedded textual data. When the search mechanism 300 returns the relevant automobile as an automobile choice, the chatbot 302 generates the GUI element to represent the relevant automobile's shape (which is represented in FIG. 3 as a generic rectangular shape); in response to an activation of the GUI element, the chatbot 302 further generates a sub-element (e.g., a dialog box) displaying "rough and tough" as text. The user may activate the GUI element by causing a pointer (e.g., a mouse cursor) to hover over the GUI element).

User selections of automobiles, as recorded in platform search data (e.g., the platform search data 170 of FIG. 1) provide feedback to further train the machine learning model. For example, when the chatbot 302 presents a sorted list of relevant automobile choices for "rough and tough" as the search query, the user's selection(s) alter the relevance score of at least one automobile. When a particular automobile has been selected as "rough and tough" a considerable number of times, the system 100 generates a label (e.g., a HTML/XML label) to add to structured data (e.g., XML data) corresponding to the particular automobile. The label may include textual data comprising "rough and tough."

FIG. 4 illustrates an embodiment of a user interface 400 for the system 100. As shown in FIG. 4, the user interface 400 includes a search portal 402, a search mechanism, operating between an online platform (e.g., the online platform 200 of FIG. 2) and users of the online platform on their client devices (e.g., the apparatus 120 of FIG. 1). In one operation mode, the search portal 402 processes a search query entered by the user and returns a set of search results having relevant items choices for the user to peruse. The search portal 402 may include a text field 404 into which the user enters the search query via a keyboard device.

FIG. 4 illustrates the search portal 402 as having search filters 406 for four different search queries: "Rough & Tough"; "Eco-Friendly"; "Tech-Ready"; and "Coal Runner". It is appreciated that other embodiments may include fewer search filters, more search filters, or different search filters. In another operation mode, the search portal 402 presents the search filters 406, and when the user activates a specific search filter $406_i$, the search portal 402 invokes a search function (e.g., software code) of the online platform for a corresponding search query. For instance, if the user activates search filter $406_2$ for "Eco-Friendly", the search portal 402 returns a set of automobile choices that are predicted to be "Eco-Friendly" given a set of features.

As described herein, the online platform may implement a machine learning model (e.g., the machine learning model 190 of FIG. 1) to identify automobile choices that are deemed "Eco-Friendly" based upon the set of features, including features directed to user activities. These features, in general, relate to an automobile's reputation among users as expressed in user-driven content. Some features correspond to actual selections by users (e.g., historical natural language searches) while other feature correspond to actual statement/descriptions by users (e.g., automobile reviews, specifications, and other user-driven content). The machine learning model may include a weighted analysis (e.g., a heuristic function) where values are attributed to an automobile's features and those values are combined with weights assigned to the features, resulting in a relevance value or score as described herein.

The online platform returns current automobile choices by updating the machine learning model in response to recent user-driven content. Hence, as users generate new descriptive materials (e.g., for new automobiles), the system 100 modifies the machine learning model, for example, by updating relevance scores to reflect changing user sentiment (e.g., in the form of word-frequency pairs). As an alternative, the search portal 402 returns a pre-determined set of automobile choices that are deemed relevant to the "Eco-Friendly."

In some embodiments, the system 100 updates the search portal 402 by adding, removing, and/or modifying the search filters 406 in response to updated relevance scores in the machine learning model. A given relevance score may reflect (at least in part) a search term's popularity; for example, the system 100 may identify "Family Friendly" as being popular search terms in a considerable number of natural language searches based upon the relevance score between "Family Friendly" and a set of automobiles. The system 100 may add a search filter with a search query directed to "Family Friendly." As an alternative, the system 100 replaces the search filter 406$_2$ for "Eco-Friendly" with a search filter for "Family Friendly" if "Eco-Friendly" is decreasing in popularity.

In some embodiments, the search portal 402 provides a sorted list of automobiles in response to an activation of any one of the search filters 406. The search portal 402 may produce illustrations or representations of automobiles sorted in accordance with at least one attribute, such as price, popularity, distance, and/or the like. Any search filter of the search filters 406 may be modified to add the at least one attribute. In addition, the sorted list of automobiles may be capped or limited in number. For example, the search filter for "Eco-Friendly" can be replaced by a search filter configured to execute a search query for ten (10) most popular "Eco-Friendly" automobiles in decreasing order of popularity. As another example, the search filter for "Coal Roller" may correspond to a search query for a sorted list of "Coal Roller" automobiles below a maximum price of ten-thousand (10,000) dollars and in increasing order by price (i.e., cheapest to most expensive).

Figure 5:
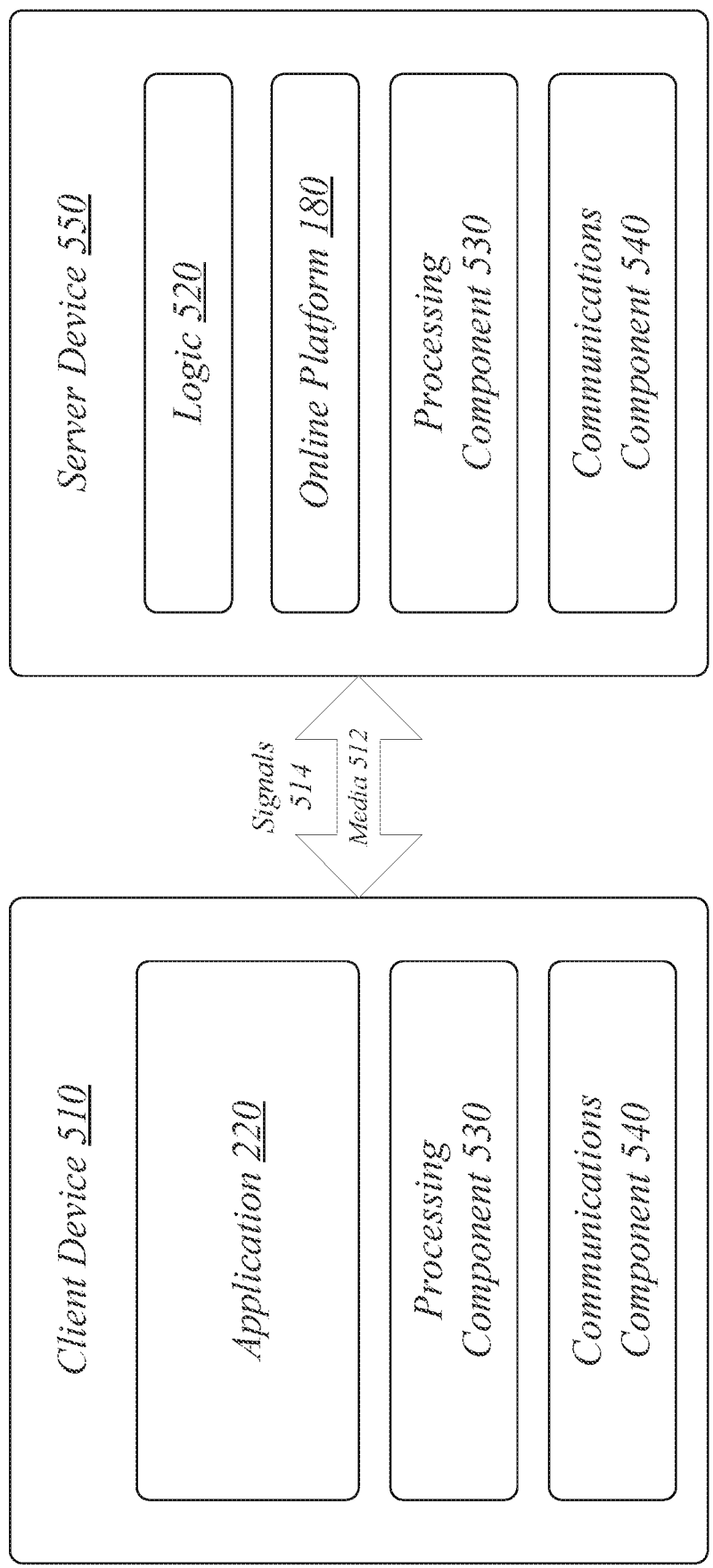
FIG. 5 illustrates an embodiment of a distributed model for the system of FIG. 1.

FIG. 5 illustrates a block diagram of a distributed model 500. The distributed model 500 may implement some or all of the structure and/or operations for the system 100 across multiple computing entities. Alternatively, a single computing entity, such as entirely within a single device, may implement some or all of the structure and/or operations for the system 100.

The distributed model 500 may distribute portions of the structure and/or operations for the system 100 across an enterprise computing network. Examples of distributed model 500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed model 500 may comprise a client device 510 and a server device 550. In general, the client device 410 and the server device 550 may be the same or similar to the apparatus 120 such as described with reference to FIG. 1. For instance, the server device 550 may each comprise a processing component 530 which is the same or similar to the processing circuit 130, as described with reference to FIG. 1. The server device 550 may implement logic 520 which may be the same or similar to the logic 150 of FIG. 1

The client device 510 may comprise or employ one or more client programs that operate to perform various methodologies in accordance with the described embodiments. In one embodiment, for example, the client device 510 may implement the application 220 as described in FIG. 2.

The server device 550 may comprise or employ one or more server programs that operate to perform various methodologies in accordance with the described embodiments. In one embodiment, for example, the server device 550 may implement the online platform as described in FIG. 1.

The devices 510, 550 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The devices 510, 550 may execute processing operations or logic for the system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, processes, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The devices 510, 550 may execute communications operations or logic for the system 100 using communications component 540. The devices 510, 550 may communicate over a communications media 512 using communications signals 514 via the communications components 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512, 542 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. It should be noted that the communications media described herein is distinct from any storage medium described herein.

In another example, the server device 550 may communicate with other devices (e.g., a device similar to the client device 510) over other communications media, using communications signals via the communications component 540. The other devices may be internal or external to a network encompassing the device 550 as desired for a given implementation.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
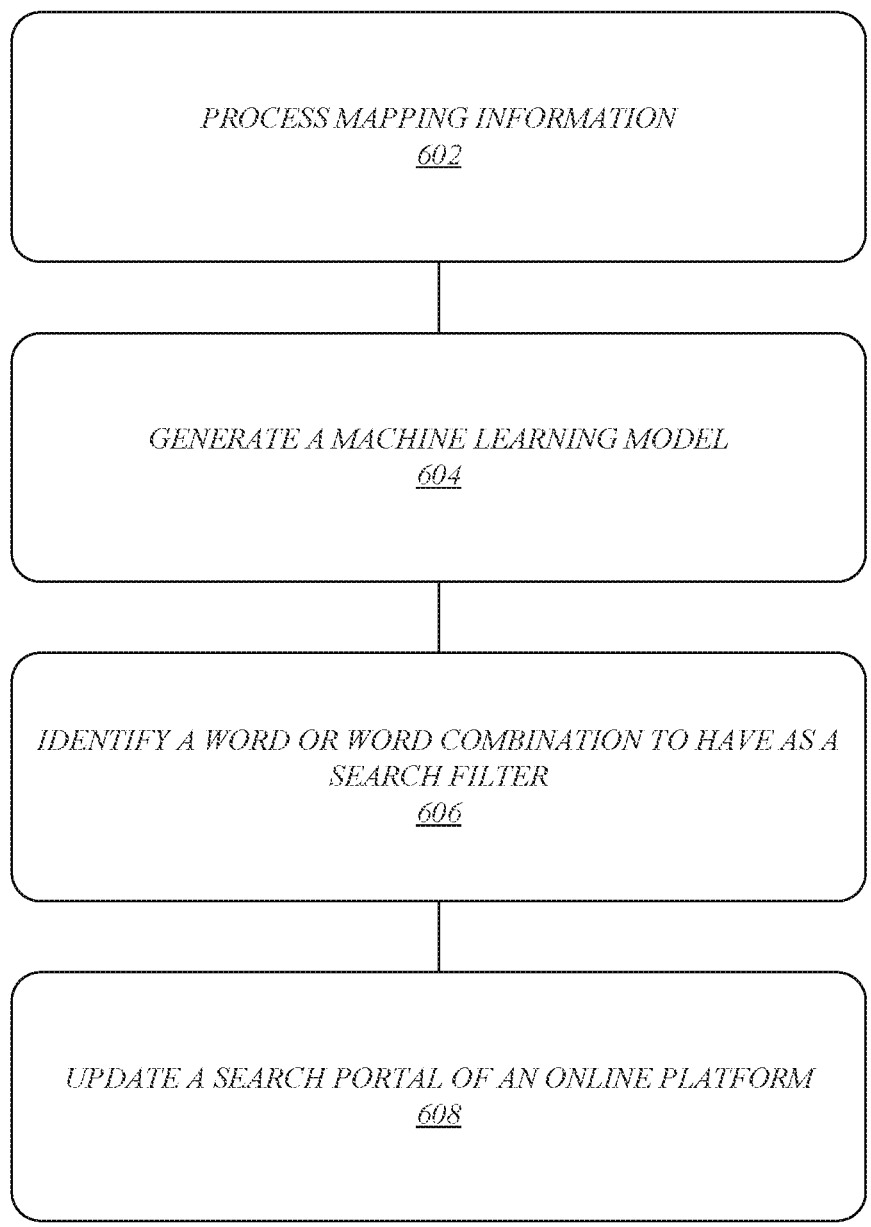
FIG. 6 illustrates an embodiment of a logic flow for the system of FIG. 1.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 processes mapping information at block 602. For example, the mapping information (e.g., the mapping information 160 of FIG. 1) may store datasets of which each dataset includes a set of words, at least one item, and one or more relevance score. The set of words may have been at least part of a previous search query. As described herein, each relevance score may refer to a probability or frequency of finding the set of words in a corpus of descriptive materials (e.g., consumer reviews corresponding to a specific item, such as an automobile).

An example dataset of the mapping information may include "Rough and Tough" as the set of words, a set of automobiles as a set of items, and a relevance score above a pre-defined threshold indicating that "Rough and Tough" is a relevant descriptive search term for the set of automobiles. For the set of automobiles, the above-mentioned relevance score for "Rough and Tough" may indicate a considerable number of appearances in consumer reviews, automobile message threads/boards, informational websites, and/or the like. It is appreciated that by "Rough and Tough" the present disclosure is generally referring to an automobile that is ready for any terrain/road condition and is durable in case of harsh driving and/or low resources. It is further appreciated that the set of automobiles may belong to a same automobile group/type (e.g., pickup trucks, sedans, and/or the like) as described herein while it may be possible that the set of automobiles belong to different automobile groups/types.

The logic flow 600 may generate a machine learning model at block 604. For example, the machine learning model (e.g., the machine learning model 190 of FIG. 1) may be built on the mapping information by proving additional features for classifying an item as being relevant to the user's search query. The machine learning model (e.g., a neural network, a Bayes statistical model, and/or the like) may implement a metric to produce values refining the above-mentioned relevance scores to reflect additional features and information.

The logic flow 600 may identify a word or word combination to have a search filter at block 606. For example, the logic flow 600 examines the above-mentioned machine learning model and determines whether there is a relationship (or mapping) between a particular set of words and a corresponding set of items (e.g., automobiles) with a relevance value that exceeds a threshold. The logic flow 600, according to some embodiments, invokes the machine learning model to determine whether a considerable number of previous searches involving the particular search query also primarily resulted in selections of one or more specific items. If a sufficient number of such searches did occur, the logic flow 600 identifies that search query to have as a search filter to facilitate future user search activity. In other embodiments, the logic flow 600 may use the machine learning model to examine relationships between search queries and sets of items and then, identify the particular search query and the corresponding set of items with a highest relevance score.

In some embodiments, the logic flow 600 may identify a word or word combination to use a label for a particular item at block 606. It is appreciated that the logic flow 600, in accordance with the present disclosure, may use the identified word or word combination as the search filter, the label, or both the search filter and the label. In some embodiments, the logic flow 600 may compare a threshold value to a relevance score between a set of words and the particular item and if that relevance score exceeds the threshold value, the logic flow 600 adds the identified word or word combination as a label. For instance, the logic flow 600 may add an HTML label/tag to a GUI representation of the particular item on a web application operating as the online platform.

If the online platform facilitates online automobile shopping, the logic flow 600 may use the machine learning model to identify automobiles that may be relevant to users and their search queries. The logic flow 600, accordingly, uses the machine learning model to determine whether, in a considerable number of previous searches, users selected a generic automobile type representing a set of automobiles (e.g., a set of pickup trucks, a set of hybrid cars, and/or the like). Those skilled in the related art would appreciate that the user's selection implies relevance and a sufficient number of user selections implies a strong relationship built on relevance. Within those previous searches, the logic flow 600 may determine which search queries were most prevalent and, amongst those search queries, identify the particular search query having a strongest relationship to the generic automobile/vehicle type. That search query (or a portion thereof) may improve the online platform by being used for a dynamic filter in a search portal and facilitating future searches involving the same or similar search query.

In some embodiments, the logic flow 600 breaks down the previous searches by actual automobile make/model and identifies the particular search query having a strongest relationship to a specific automobile (e.g., having a highest relevance score amongst other search queries). As described herein, the relevance score may be any value denoting a quality of relevance to either a specific automobile make/model—such as in these embodiments—or a generic automobile type. In addition, the relevance score may be computed from a heuristic function and a feature set as input to the heuristic function. The relevance score also may be a frequency or percentage of finding the particular search query in a corpus of materials, which may consist of materials describing automobiles in general or, in other embodiments, of materials restricted to describing the specific automobile make/model. It is appreciated that the present disclosure does not foreclose on any metric for computing the relevance score.

In some embodiments, the logic flow 600 may partition the above-mentioned particular search query into search terms and identify, from amongst those search terms, a set of words to use as a search filter. Some search queries include superfluous and/or unnecessary words that can be removed for the sake of clarity and brevity. This may be because the search query was entered in a natural language format. In some embodiments, the logic flow 600 determines one or more similar/alternate phrasings for the search terms and groups together their individual mappings. For instance, if "rugged and tough" is an equivalent to "rough and tough", the logic flow 600 may combine their relevance scores in the machine learning model and treat both search terms as interchangeable.

The logic flow 600, according to some embodiments, invokes the machine learning model to determine whether a considerable number of previous searches involving any of the user's search queries primarily resulted in selections of one or more specific automobiles, that search query may be used as a search filter to facilitate future searches involving the same search query. The logic flow 600 may use that search query as a label for the one or more specific automobiles. The label may appear on any specific automobile, for example, based upon a popularity attribute within certain chatbot searches. If users looking for "extra large cargo space" tend to select a specific pickup truck (e.g., GMC® Yukon®) inside a search mechanism (e.g., a search portal (e.g., the search portal 402 of FIG. 4) or a chatbot (e.g., the chatbot 302 of FIG. 3)), then that specific pickup truck may be coupled to a label such that the online platform displays "ideal for extra-large cargo space" when a platform user views that specific pickup truck.

The logic flow 600 may update a search portal of the online platform at block 608. The logic flow 600 may add a GUI element to the online platform to insert a search filter for the identified search query. In some embodiments, the logic flow 600 may insert executable instructions into application code into a mobile application (e.g., the application 220 of FIG. 2) operating as a client agent for the online platform; the added executable instructions may be configured to generate the GUI element for presentation and when the GUI element is activated, to run a search for the identified search query. The embodiments are not limited to this example.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 runs an online platform and generates a search mechanism at block 702. For example, the online platform (e.g., the online platform 200 of FIG. 2) may be part of a turnkey e-commerce solution having various User Interface (UI) components, such as the search mechanism configured to process/execute search queries and return/present search results. The logic flow 700 may be configured to run the online platform on a server of an enterprise system. The enterprise system may be organized according to a distributed model/architecture of which the server is part of or in addition to a client device. The logic flow 700, via the server, cooperates with an application (e.g., a mobile application) that is configured to run on the client device (e.g., a mobile device, such as a smartphone). In operation, the application generates content to present a graphical user interface The logic flow 700 may update a machine learning model in response to recent chatbot searches at block 704. For example, the logic flow 700 may record search data (e.g., platform search data 170 of FIG. 1) as users submit search queries, review search results, and make selections of items of interest. After the machine learning model is first built on an initial dataset, that machine learning model may change over time. In some instances, the initial dataset may be too small in size to serve as a sample and any relationship identified in that dataset may be pedestrian and improperly founded. This relationship may not be statistically significant and may not be reflected in larger sample sizes.

The logic flow 700 may update a search portal of an online platform by adding a new search filter, removing a current search filter, and/or replacing a current search filter with a new search filter at block 706. For example, a current search filter may no longer reflect a popular search query; because, over time, fewer searches have been conducted for the current search filter, the current search filter may be removed from the search mechanism and (perhaps) replaced by another search filter. As another example, a current search filter may no longer reflect an appropriate search query for describing a particular set of items. This may occur when a set of words comprising a search query changes in meaning or usage. Based upon data tracking word-frequencies in descriptive materials (e.g., the items database 115 of FIG. 1), the logic flow 700 may determine that the current search filter's corresponding search query rarely appears or no longer appears in materials describing the particular set of items. Recent literature, for instance, may use a different set of words to describe the particular set of items. As yet another example, search filters may be dependent upon user preferences including location-based preferences (e.g., geography, ZIP code and/or the like). To illustrate, the online platform for a user with an inner-city ZIP code most likely is looking for an eco-friendly city car for commuting; a search filter for "rough and tough" (although popular) may not be germane to that user's online platform.

Additional search data may alter natural language relationships between sets of words and sets of items. If the machine learning model is a statistical model, the additional search data may alter probabilities correlating search queries to relevant items. In some embodiments, a replacement search filter for a current search filter may reflect a recent search query that is gaining in popularity. Word-frequencies may not conform to a linear progression, and as such, some search queries may no longer be prevalent while other search queries may rise in prevalence. With respect to the automobile commercial market, the replacement search filter may correspond to a new vehicle or new class of vehicles that have gained traction amongst automobile enthusiasts and automobile publications. As another example, a current search filter in the online platform may not be suitable for a user given their preferences while another search filter may better match the user's preferences. The embodiments are not limited to this example.

Figure 8:
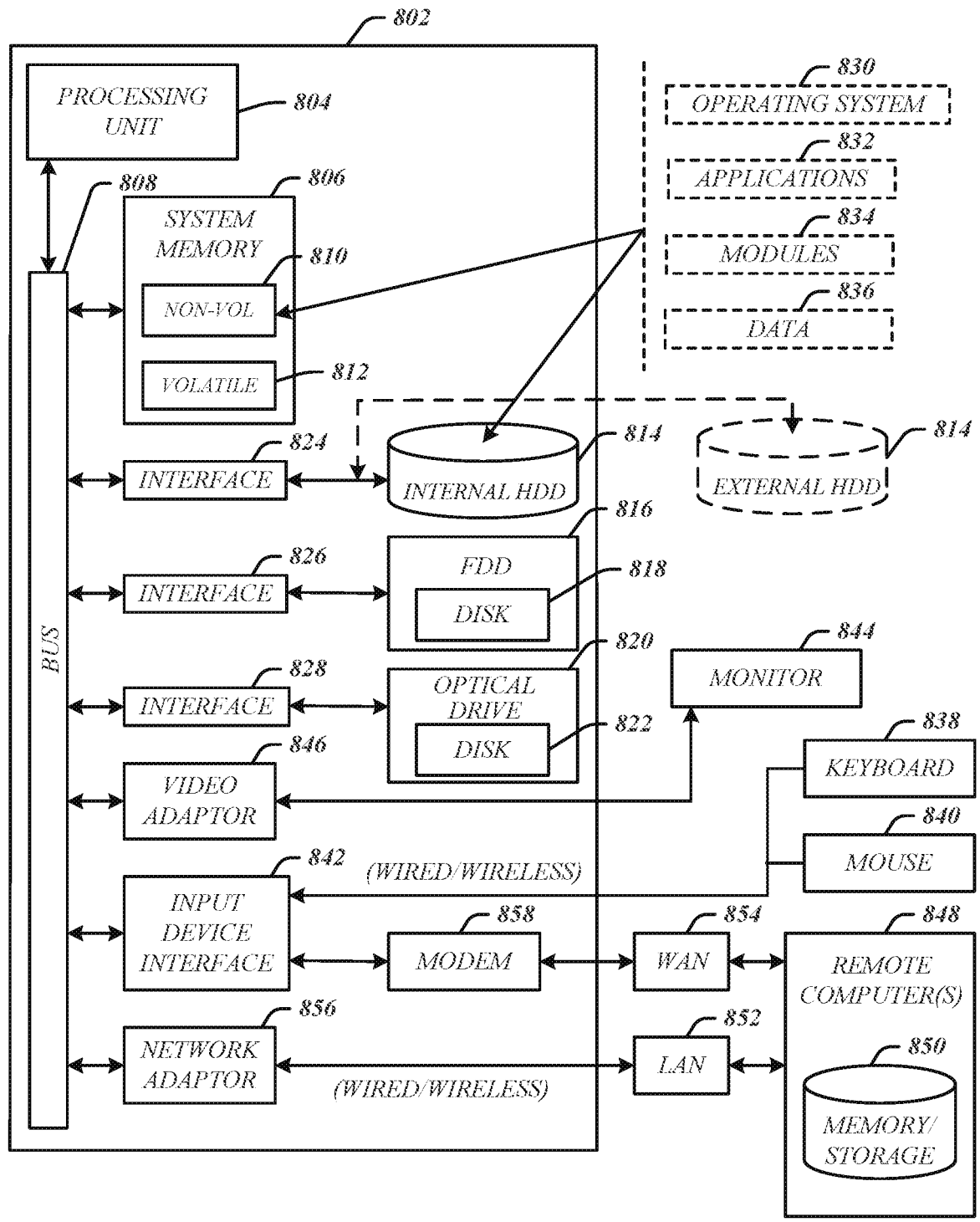
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Embodiments of the computer-readable storage medium described herein exclude propagating signals, carrier waves, and other transitory media used for transmission or communication. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable storage medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
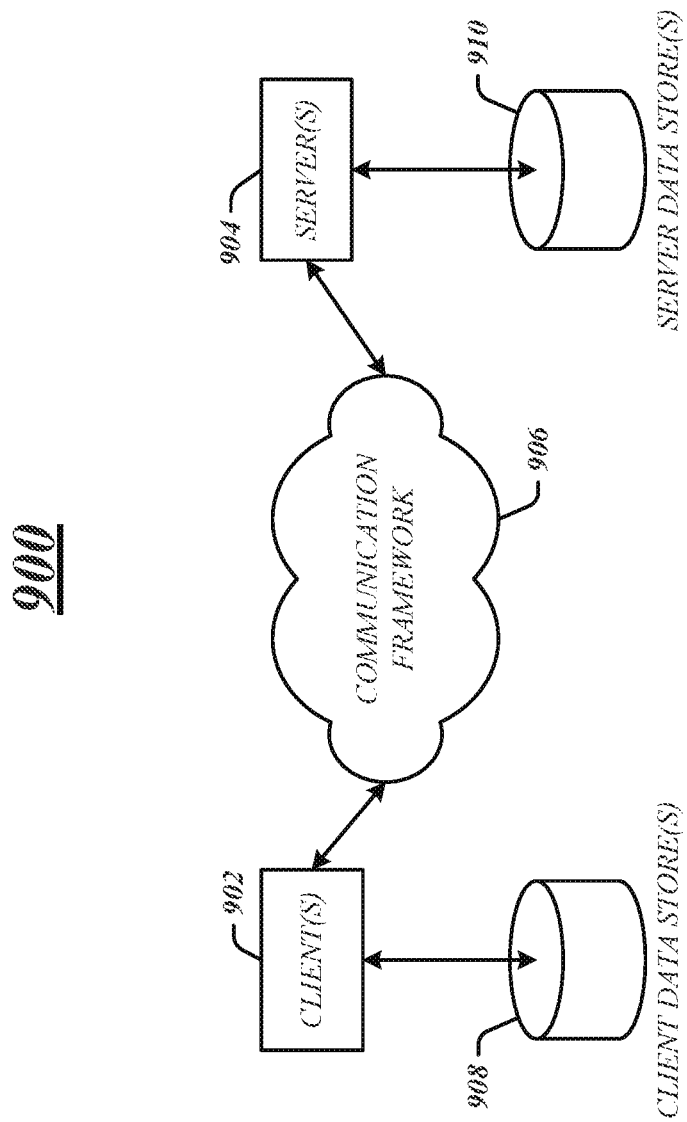
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 910. The servers 904 may implement the server device 950. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processing circuit; and
logic stored in computer memory and executed on the processing circuit, the logic operative to cause the processing circuit to:
cause, on a display of a client device, presentation of a search portal comprising a set of search filters;
identify, from a machine learning model, a word or word combination for use as a search filter for the search portal, wherein the word or the word combination is based on search terms from search queries;
update the set of search filters to include the search filter for the search portal; and
cause, on the display of the client device, presentation of the search portal updated with the search filter.

2. The apparatus of claim 1, comprising logic operative to cause the processing circuit to update the set of search filters with a Graphical User Interface (GUI) element corresponding to the search filter.

3. The apparatus of claim 1, comprising logic operative to cause the processing circuit to remove from the set of search filters a Graphical User Interface (GUI) element corresponding to another search filter when updating the set of search filters with another GUI element corresponding to the search filter.

4. The apparatus of claim 1, comprising logic operative to cause the processing circuit to train the machine learning model with a data set and platform search data, the data set comprising a set of words, a set of items, and at least one relevance score, and the platform search data corresponding to the search queries and comprising selections of items associated with the search terms.

5. The apparatus of claim 4, comprising logic operative to cause the processing circuit to update the at least one relevance scores of the set of words based upon the platform search data.

6. The apparatus of claim 4, comprising logic operative to cause the processing circuit to update the set of items corresponding to the set of words in response to the platform search data.

7. The apparatus of claim 4, comprising logic operative to cause the processing circuit to identify the word or word combination corresponding to a highest relevance score in the data set and platform search data.

8. The apparatus of claim 1, wherein the search portal is caused to be presented in a web browser or an application of the client device.

9. A computer-implemented method, comprising:
presenting, by a processor and on a display of a client device, a search portal comprising a set of search filters;
identifying, by the processor and from a machine learning model, a word or word combination for use as a search filter for the search portal, wherein the word or the word combination is based on search terms from search queries;
modifying, by the processor, the set of search filters presented on the display to include the search filter for the search portal; and
updating, by the processor and on the display of the client device, the presentation of the search portal to include the search filter.

10. The computer-implemented method of claim 9, wherein updating the presentation of the search portal includes updating the set of search filters with a Graphical User Interface (GUI) element corresponding to the search filter.

11. The computer-implemented method of claim 9, comprising removing, by the processor and from the set of search filters, a Graphical User Interface (GUI) element corresponding to another search filter when updating the set of search filters with another GUI element corresponding to the search filter.

12. The computer-implemented method of claim 9, comprising training, by the processor, the machine learning model with a data set and platform search data, the data set comprising a set of words, a set of items, and at least one relevance score, and the platform search data corresponding to the search queries and comprising selections of items associated with the search terms.

13. The computer-implemented method of claim 12, comprising updating the relevance score of the set of words based upon the platform search data.

14. The computer-implemented method of claim 12, comprising updating, by the processor, the set of items corresponding to the set of words in response to the platform search data.

15. The computer-implemented method of claim 12, comprising identifying, by the processor, the word or word combination corresponding to a highest relevance score in the data set and platform search data.

16. The computer-implemented method of claim 12, wherein the search portal is presented in a web browser or an application of the client device.

17. A non-transitory computer-readable storage medium comprising instructions that, when executed, cause a system to:
cause, on a display of a client device, presentation of a search portal comprising a set of search filters;
identify, from a machine learning model, a word or word combination for use as a search filter for the search portal, wherein the word or the word combination is based on search terms from search queries;
update the set of search filters to include the search filter for the search portal; and
cause, on the display of the client device, presentation of the search portal updated with the search filter.

18. The non-transitory computer-readable storage medium of claim 17, comprising instructions that when executed cause the system to update the set of search filters with a Graphical User Interface (GUI) element corresponding to the search filter.

19. The non-transitory computer-readable storage medium of claim 17, comprising instructions that when executed cause the system to remove from the set of search filters a Graphical User Interface (GUI) element corresponding to another search filter when updating the set of search filters with another GUI element corresponding to the search filter.

20. The non-transitory computer-readable storage medium of claim 17, comprising instructions that when executed cause the system to train the machine learning model with a data set and platform search data, the data set comprising a set of words, a set of items, and at least one relevance score, and the platform search data corresponding to the search queries and comprising selections of items associated with the search terms.

* * * * *